Sept. 14, 1965 C. G. THORNTON 3,206,339

METHOD OF GROWING GEOMETRICALLY-DEFINED EPITAXIAL LAYER WITHOUT FORMATION OF UNDESIRABLE CRYSTALLITES

Filed Sept. 30, 1963 4 Sheets-Sheet 1

INVENTOR.
CLARENCE G. THORNTON
BY
Robert D. Sanborn
ATTORNEY

INVENTOR.
CLARENCE G. THORNTON
BY
Robert D. Santon
ATTORNEY

INVENTOR.
CLARENCE G. THORNTON
BY
Robert D. Sanborn
ATTORNEY

Sept. 14, 1965 C. G. THORNTON 3,206,339

METHOD OF GROWING GEOMETRICALLY-DEFINED EPITAXIAL LAYER WITHOUT FORMATION OF UNDESIRABLE CRYSTALLITES

Filed Sept. 30, 1963 4 Sheets-Sheet 4

INVENTOR.
CLARENCE G. THORNTON
BY

ATTORNEY

United States Patent Office 3,206,339
Patented Sept. 14, 1965

3,206,339

METHOD OF GROWING GEOMETRICALLY-DEFINED EPITAXIAL LAYER WITHOUT FORMATION OF UNDESIRABLE CRYSTALLITES

Clarence G. Thornton, Ambler, Pa., assignor to Philco Corporation, Philadelphia, Pa., a corporation of Delaware Filed Sept. 30, 1963, Ser. No. 312,703
9 Claims. (Cl. 148—175)

This invention relates to silicon semiconductor devices and to methods for making them.

It is known in the prior art that junctions between semiconductive materials of different conductivity types, for example, pn, ni, and pi junctions, can be made so that they act as rectifiers of electrical current. One method which has been proposed for making semiconductor junctions employs epitaxial growth of a layer of semiconductive material of given conductivity-type on a base body of different conductivity-type so that the grown layer and the underlying material together form a single-crystal junction. This method is of particular interest because it permits very accurate control of the resistivity gradient in the growth region and because it lends itself readily to mass-production and microelectronic techniques. Other circuit components, such as resistors, can be formed also by epitaxial growth of material of appropriate conductivity. The material employed to form these elements may have the same conductivity-type as the substrate or a different conductivity-type.

The copending application of Jack M. Hirshon, Serial No. 179,973, filed March 15, 1962 discloses and claims a process for epitaxially growing layers on selected regions only of a body. In accordance with the method disclosed by Hirshon an adherent layer of an insulating oxide of silicon is provided over a part only of a silicon body, leaving exposed the portion of the silicon body on which growth is to occur. Silicon of conductivity suitable for producing a rectifying junction with the underlying silicon body is then grown epitaxially upon the exposed silicon. Preferably the exposed regions of the silicon body are provided by one or more apertures extending through the silicon oxide and produced by photolithographic techniques. As explained in the copending application these apertures may be arranged to provide an assembly of epitaxially-grown rectifying elements designed to be operated together as a single functional unit. The epitaxial growth may be provided by vapor deposition of silicon involving the hydrogen reduction of silicon tetrachloride, or another silicon halide, with any desired metallic impurity element being added during deposition by the simultaneous hydrogen reduction of a halide of the impurity metal. Alternatively it may be provided by other known methods such as the pyrolysis of $SiH_4$.

This method provides the advantages of convenient junction location and delineation, compatibility with microelectronic processes and structures, and control of resistivity which are characteristic of epitaxial-junction formation. Originally it was believed that, after the epitaxial growth step, suitable contacts to the opposite sides of the junction and suitable connections between the various units could be provided by ordinary evaporation of a metal through a mask onto the oxide layer which surrounds the growth areas.

However it has been discovered that generally it is not possible to employ contacts deposited on the oxide layer for the reason that during the epitaxial deposition step stray crystallites of silicon tend to form on the masking oxide layer. These crystallites frequently penetrate the oxide layer and make electrical contact with the underlying body. Therefore such crystallites would provide a short circuit connection between the deposited contacts or connections and the underlying body. Generally it is not possible to reoxide the structure to place an insulating layer over the crystallites since the crystallites tend to penetrate the overlying layer as well as the underlying layer. While the stray growth of crystallites appears to be most evident in the epitaxial growth of silicon it occurs also in the epitaxial growth of other substances by methods similar to the one outlined above.

It has been found also that, when employing the method described above, the epitaxially-grown layer tends to be somewhat thicker in regions adjacent the edge of the mask than in regions more remote from the mask.

Accordingly, it is an object of my invention to provide a new and improved method for the fabrication of semiconductive devices suitable for microelectronic circuitry.

Another object of the present invention is to provide a method of fabrication of semiconductive devices which provides freedom from stray crystallite growth.

A further object is to provide a method for obtaining epitaxially-grown regions of uniform thickness on a suitable body.

Still another object of the invention is to provide an improved method for fabricating a plurality of rectifying junctions by epitaxial growth of silicon in predetermined patterns on a silicon body.

A further object of the invention is to provide an improved method of fabricating a structure employing a plurality of epitaxially-grown rectifying junctions on a single body, which structure will receive readily, adherent conductive connections between the various elements.

I have discovered that in employing the epitaxial deposition method of Hirshon substantially no crystallites occur in the region immediately adjacent the exposed regions of the body and that the number of crystallites per unit area decreases as the area of the exposed body increases.

Therefore, in accordance with my invention, an adherent layer of an insulating oxide, for example silicon dioxide, is provided on the body which may comprise for example a silicon wafer, only in norrow bands surrounding the areas on which epitaxially-grown elements are to be formed. These narrow bands may be formed by providing an oxide layer over the entire body and then removing selected portions of the oxide layer by photolithographic techniques to leave the desired narrow bands. Epitaxial growth on the now largely exposed surface of the body may be provided by known methods, for example, the epitaxial growth of silicon may be achieved by vapor deposition of silicon involving the hydrogen reduction of silicon tetrachloride, or other silicon halide, with any desired metallic impurity element being added during the deposition by the simultaneous hydrogen reduction of the halide of the impurity metal. While epitaxial growth occurs over a large area of the body the regions in which the junction devices or resistors are to be formed are geometrically defined with great precision and electrically isolated from the surrounding regions by the respective narrow oxide bands. Also, since the surface of the body is largely exposed and deposition is occurring substantially uniformly over the surface area of the entire body, there is less tendency for the concentration of the reactant gas in the stream to vary over the surface of the wafer than there is when epitaxial growth occurs only in relatively small unmasked areas. As a result, the growth is more uniform in the area defined by narrow masking bands than it is in areas defined by openings in a mask which covers a large percentage of the surface area of the wafer. After the epitaxial growth step the surface of the substrate or wafer may be re-oxidized to provide an insulating surface to receive suitable contacts and inter-connections for the devices formed thereon. Since the narrow bands of oxide are substantially free of stray crystallite growth there is little likelihood of a short circuit between such applied conductors and the underlying wafer.

For a better understanding of the present invention together with other and further objects thereof consideration should now be given to the following detailed description taken in conjunction with the accompanying drawings in which.

Figure 1:
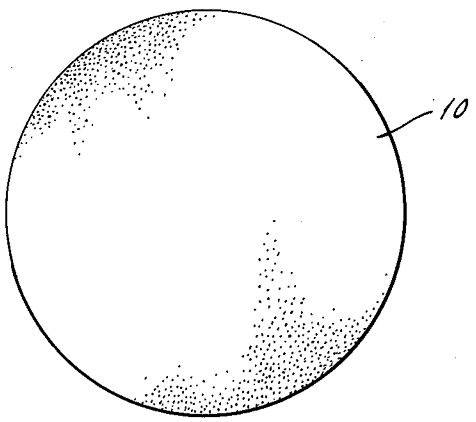
FIG. 1 is a plan view of a typical wafer on which regions of different types of material are to be grown epitaxially.
Figure 2:
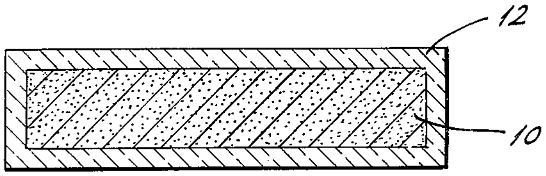
FIG. 2 is a cross-sectional view of the wafer of FIG. 1, taken along a diameter thereof, after the formation of a surface oxide layer.

The invention will now be described, by way of example only, with respect to the formation of a pn junction to an n-type wafer. The several figures are not necessarily to scale, however like parts are designated by like numerals. Referring to FIGURES 1 and 2 the starting material may be a circular wafer 10 of silicon, in this case of n-type conductivity, having a resistivity of about 0.2 to 4 ohm-centimeters and a crystal orientation of about 0.5 degrees to 4 degrees from the 1,1,1-crystal orientation. It will be understood that the exact size and shape of the wafer is not of critical importance and may be selected to permit the formation thereon of the desired number of circuit elements. In this example the wafer may be about ¾ inch in diameter, mechanically lapped to a thickness of about 10 mils and polished. It is then given a light etch in a solution of hydrofluoric, nitric and acetic acid to clean the surfaces of the wafer and to remove any damage produced on the crystal surfaces by the preceding lapping and polishing.

As shown in FIGURE 2, an adherent insulating layer 12 of silicon oxide is formed over the surface of wafer 10. Oxide thicknesses up to at least 1.5 microns can be obtained without cracking. This oxide is primarily silicon dioxide and will be so disignated hereinafter. While the silicon dioxide layer may be formed by several known methods, such as chemical deposition, I prefer to form it by thermal growth. This technique is well-known in the art and hence need not be described here in detail. Typically the prepared silicon wafer is maintained at about 1200° C. in oxygen for about 16 hours, or in a mixture of oxygen and steam for about ½ hour, to form an oxide layer having a thickness of the order of 1 micron.

Figure 3:
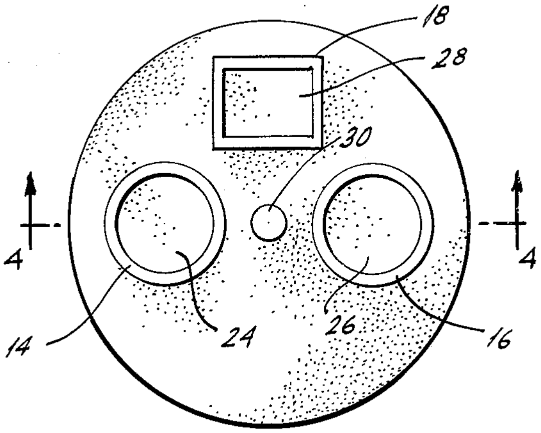
FIG. 3 is a plan view of the wafer of FIG. 2 after the surface oxide has been removed in all areas except narrow bands defining the areas selected for epitaxial growth.
Figure 4:
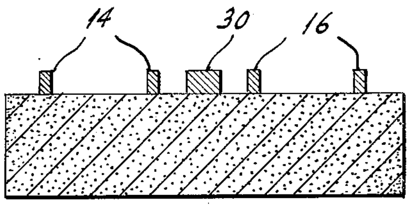
FIG. 4 is a cross-sectional view of the prepared wafer of FIG. 3 taken along the line IV—IV.

Next, as shown in FIGS. 3 and 4, the oxide layer is removed to expose the underlying silicon wafer 10 in all areas except for the bands 14, 16 and 18 which surround the regions 24, 26, and 28 in which rectifying elements are to be made and the region 30 at which an electrical contact to the wafer 10 will be made. The provision for a contact on the upper side of the wafer is shown by way of further illustration of the masking technique. It is to be understood that in many instances it may be preferable to lap the lower side of the wafer 10 following the epitaxial growth step to reduce wafer 10 to the desired thickness and then apply an ohmic contact to the lower surface of the wafer 10. The bands 14, 16 and 18 and region 30 may be formed by known photolithographic techniques. For example the upper surface of wafer 10 bearing the silicon dioxide layer 12 may be covered with a conventional photographic resist (not shown), which is then exposed in those areas 14, 16, 18, and 30 in which the oxide layer is to remain. The resist layer is rinsed in a suitable developer solution which removes the portions of the resist which were not exposed. The resultant assembly is then immersed in an etching solution which dissolves silicon dioxide, in the regions exposed by the resist. Buffered hydrofluoric acid is a suitable etchant. The remaining resist is then dissolved and washed off to produce the assembly shown in FIGURES 3 and 4. FIGURE 3 in a plan view of the wafer. FIGURE 4 is a cross-sectional view taken along the line IV—IV of FIGURE 3. It should be noted that each of the areas 24, 26 and 28 is defined by a respective narrow surrounding band of silicon dioxide 14, 16, and 18. Area 30 represents a solid dot or post of silicon dioxide. The location and size of the areas 24, 26, and 28 can be controlled easily, aperture diameters are from 5 mils to 200 mils being typical for various applications. The width of the bands 14, 16, and 18 may be from 1 to approximately 5 mils.

Figure 10:
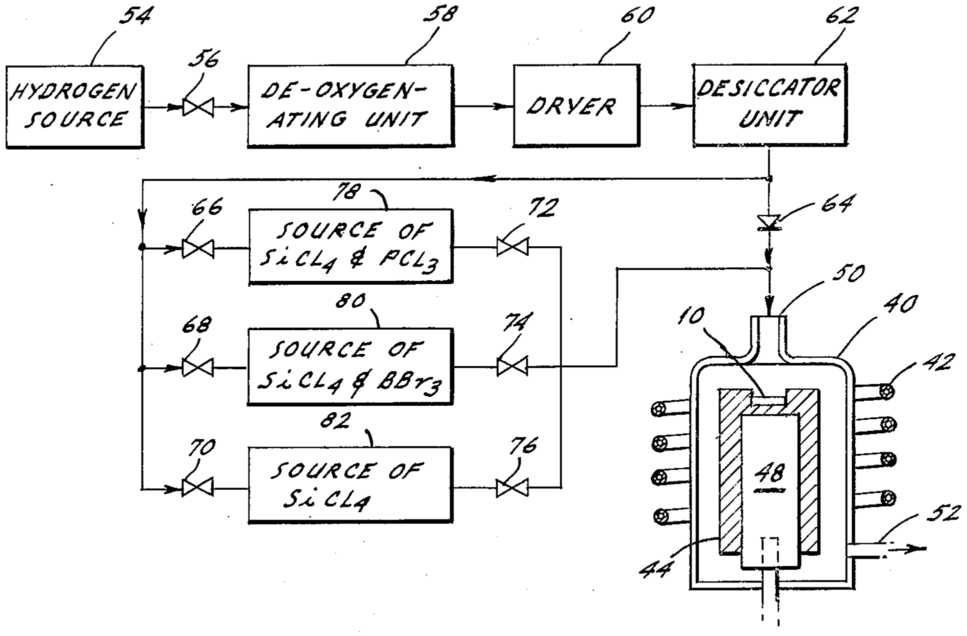
FIG. 10 is a diagrammatic showing of apparatus which may be employed to produce the epitaxially-grown layers on the prepared wafer of FIGS. 3 and 4.

The next step is to grow p-type silicon epitaxially on the exposed surface of the n-type silicon wafer 10. Various methods for performing such epitaxial growth are well-known in the art. I prefer to utilize for the purpose a vapor deposition process making use of the hydrogen reduction of $SiCl_4$ and of a halide of the impurity metal which is to be introduced into the silicon. Such a method is described in detail for example in an article by H. C. Theuerer in the Journal of Electrochemical Society, volume 108, page 649 (1961). One typical arrangement for performing such epitaxial growth is represented in FIGURE 10 hereof and comprises a chamber 40, having water-cooled walls, which is surrounded by a radio frequency heating coil 42. The chamber contains a quartz pedestal 44 for supporting the silicon wafer 10 which is to be subjected to epitaxial growth, and a graphite cylinder 48 within the pedestal 44, in which cylinder heating currents are induced by operation of the RF heating coil 42 in a conventional manner. It is to be understood that while the wafer 10 represents the semiconductor assembly of FIGURES 3 and 4, all of the details of the silicon oxide layer are not shown in FIGURE 10. A gas inlet 50 and a gas outlet 52 permit establishment of gaseous flow through the chamber 40.

The vehicle gas used in the process is hydrogen, which is provided by any suitable source 54 of hydrogen under appropriate pressure. By opening gas valves 56 and 64 the hydrogen is permitted to flow through a deoxygenating unit 58, dryer 60, and an absorption type desiccator unit 62 which may be an assembly containing granular synthetic zeolite operated at −195° C. These elements operate in a conventional manner to remove oxygen from hydrogen gas, to dry the gas, and to remove other condensatable gaseous impurities which may be present in the hydrogen. At a result, the hydrogen gas emanating from the assembly 62 is extremely pure. With valve 64 open and valves 66, 68, 70, 72, and 76 closed the hydrogen gas may be caused to flow directly through the chamber 40 when it is desired to flush out the system. Source 78 may comprise a solution of silicon tetrachloride and phosphorus trichloride through which the vehicle gas is bubbled. Similarly source 80 may include a solution of silicon tetrachloride and boron tribromide and source 82 a solution of silicon tetrachloride with nodopant impurities.

With the arrangement shown in FIGURE 10 epitaxial growth of different conductivity types can be provided on wafer 10 as follows.

First, n-type silicon can be grown on wafer 10 by closing all valves except 56, 66, and 72 so that the hydrogen gas is forced to flow through the unit 62, through the source 78 of silicon tetrachloride and phosphorus trichloride and thence to the inlet 50 of chamber 40. In passing through source 78 the hydrogen picks up small quantities of silicon tetrachloride and phosphorus trichloride and carries them to chamber 40 where, at a temperature of 1200° to 1400° C., the hydrogen reduces the silicon tetrachloride and phosphorus trichloride to produce free silicon and free phosphorus which then deposit on wafer 10 and form thereon a single-crystalline extension comprising silicon doped with phosphorus to make it n-type. Preferably the conditions are selected so that the reduction of the silicon tetrachloride occurs only at the hot surface of water 10 so that there is no free elemental silicon in the gas stream.

Alternatively, p-type silicon can be grown epitaxially on wafer 10 by closing all valves except 56, 68 and 74 so that the hydrogen passes through the source 80 of silicon tetrachloride and boron tribromide before reaching chamber 40. In this case silicon containing boron grows as a single-crystalline extension on wafer 10 to provide a p-type layer thereon.

Finally, a high resistivity or substantially intrinsic silicon can be grown on wafer 10 by closing all valves except 56, 70 and 76 so that before reaching chamber 40 the hydrogen passes through the source 82 of silicon tetrachloride which contains no dopant impurity. In this case pure silicon is grown epitaxially on wafer 10 in chamber 40.

It is to be understood that the silicon is deposited on all exposed areas of the silicon wafer 10 including those areas surrounding bands 14, 16 and 18 as well as the areas bounded by these bands. However no silicon is deposited on the bands 14, 16 and 18 per se and, because of the proximity of the exposed areas of the wafer 10, no crystallites are formed on the narrow bands 14, 16 and 18. In general, area 30 may be made small enough so that no crystallites are formed thereon. However the formation of crystallites in this area is unimportant since, as noted above, this region will be employed to make electrical contact with the underlying wafer 10. In order to simplify the drawing only the deposit on the upper surface of wafer 10 is shown. It is to be understood that any silicon deposited on the edges or underside of wafer 10 will not affect the operation of the devices formed on the upper surface of wafer 10.

One specific procedure for performing epitaxial growth of a p-type layer on an n-type wafer is as follows. The semiconductor wafer assembly shown in FIGURES 3 and 4 is cleaned by scrubbing with detergent, applying ultrasonic cleaning techniques, rinsing for a few seconds in buffered hydrofluoric acid and then rinsing in deionized water. The hydrofluoric acid serves to remove any thin oxide layer which may be formed on the exposed silicon surface regions during contact with room air, so that the underlying silicon wafer 10 will be exposed directly to the epitaxial growth conditions. For this reason the previously-formed silicon dioxide layer 12 should be made sufficiently thick that, after the assembly is cleaned with hydrofluoric acid, the thickness of layer 12 still remaining provides the desired masking action.

After the above-mentioned water rinse the assembly shown in FIGURES 3 and 4 is blown dry with clean nitrogen and, if it is to be stored for a period of time, is kept in a clean nitrogen atmosphere. Preferably it is placed promptly in chamber 40. The system while cold is flushed out thoroughly with hydrogen from source 54, which flows through valve 64 without passing through the sources of silicon tetrachloride. As the hydrogen flow is continued the RF heater 42 is operated to bring the temperature of the silicon wafer 10 into a range of about 1200° to 1400° C., where it is kept for about 10 minutes before the valve 64 is closed and valves 68 and 74 open so that hydrogen flows through the silicon tetrachloride and boron tribromide. This flow is continued for a time depending upon the thickness of the p-type silicon layer which is to be grown epitaxially. Times from 10 seconds to 5 minutes are typical with a flow rate of approximately 1 to 2 liters per minute through unit source 78. Additional hydrogen may be introduced by way of valve 64 if desired. The epitaxial silicon grows at the rate of about 0.3 to 1 micron per minute, and in the present example the process may be continued for about 1 to 4 minutes to grow a 1-micron thick p-type layer on the underlying n-type silicon. The resulting epitaxially-grown p-type material has a resistivity of about 0.001 ohm-centimeter to about 0.01 ohm-centimeter. At this point valves 68 and 74 are closed, valve 64 opened to permit hydrogen alone to pass through the chamber 40, and the heating discontinued so that cooling of chamber 40 and the semiconductor assembly occurs in the hydrogen atmosphere. Relatively rapid cooling will prevent diffusion of p-type impurities into the n-type wafer. When the chamber 40 has been cooled the wafer is removed. If desired it may be cleaned in a detergent, rinsed in deionized water and blown dry.

The amount of silicon tetrachloride in the hydrogen during the above-mentioned process may be controlled by changing the temperature of the material source 80. The amount of boron, which in turn determines the resistivity of the grown silicon, may be controlled by selection of the percentage of boron tribromide included in source 80. Typically the amount of boron tribromide is of the order of 0.1 to 1000 parts per million of silicon tetrachloride.

Figure 5:
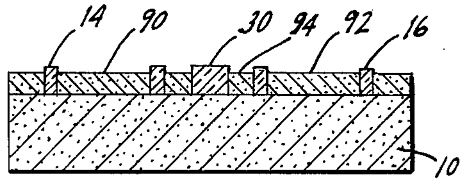
FIG. 5 is a view similar to FIG. 4 showing the addition of the epitaxially-grown layer.

The resultant structure is shown in FIG. 5 where the epitaxially-grown p-type regions 90, 92 and 94 have been formed on the underlying silicon wafer 10. Regions 90 and 92 are within the bands 14 and 16 and are electrically isolated from each other and from region 94. Regions such as regions 90 and 92 have been found to be of substantially uniform thickness with little or no tendency to thicken in the vicinity of the mask.

The thickness of the epitaxially-grown layer may be equal to, greater than or less than the height or thickness of the bands 14 and 16. Best definition of the epitaxially-grown region is obtained if the thickness of the epitaxial layer is not greater than the thickness of the bands 14 and 16.

Figure 6:
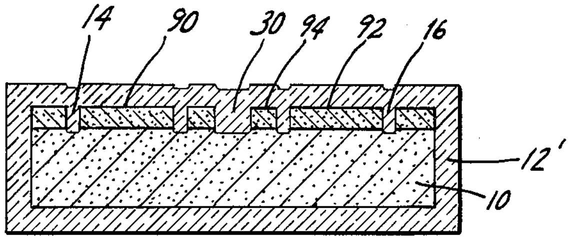
FIG. 6 is a view of the wafer of FIG. 5 after reoxidation.

The assembly shown in FIGURE 5 may be reoxidized in the manner described above to provide, as shown in FIG. 6, a new oxide layer 12' over the entire upper surface of wafer 10. Since oxide formation on the silicon layer is a self-limiting process, the growth will be most rapid on the regions 90, 92 and 94 of exposed silicon, and less rapid in the region of bands 14, 16 and 18 and area 30. As shown in FIGURE 6, slight irregularities may occur in the surface of layer 12' at positions corresponding to bands 14, 16 and 18 and area 30. The extent of these irregularities will depend on the thickness of the original layer 12, the thickness of the epitaxially-grown layer in regions 90, 92 and 94 and the thickness of new oxide layer 12'.

Figure 7:
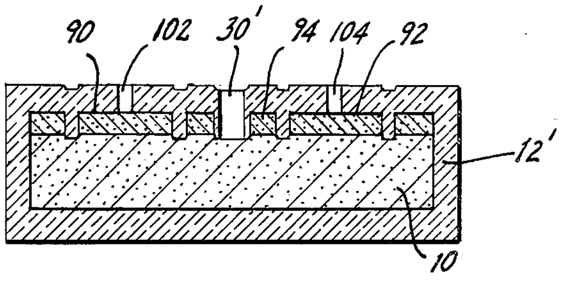
FIG. 7 is a view of the wafer of FIG. 6 with portions of the surface oxide removed to provide openings through which electrical contact may be made to selected regions of the wafer.
Figure 8:
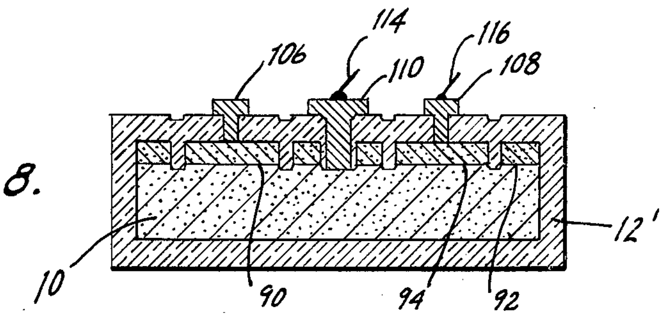
FIG. 8 is a cross-sectional view showing the wafer with the electrical contacts in place.
Figure 9:
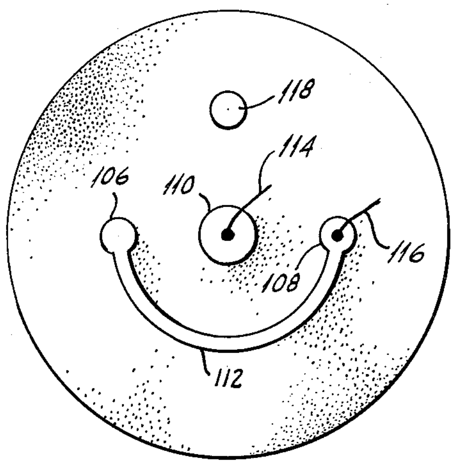
FIG. 9 is a plan view of the wafer of FIG. 8.

As shown in FIGS. 7, 8 and 9, electrical contact areas for regions 90 and 92 and wafer 10 may be formed by selectively removing the oxide layer 12' in the regions 102 and 104 and both the layers 12′ and the previously formed layer 12 in the region 30′. Region 30′ corresponds generally to the region 30 of FIGURE 3. Selective removal of the oxide may be accomplished photolithographically in the manner described above. Contacts 106, 108 and 110 may be formed in openings 102, 104 and 30′, respectively, by vacuum evaporation of a suitable metal through a mask or by any other suitable technique. Contacts 106 and 108 make ohmic connection to areas 90 and 92 while contact 110 makes ohmic connection to the wafer 10.

The conductive element 112 shown in FIGURE 9 is exemplary of electrical conductor configurations which may be formed on oxide layer 12′ to make electrical connections between various elements on wafer 10. If desired, electrical leads, such as leads 114 and 116, may be thermocompression welded or otherwise connected to appropriate contact areas, for example areas 110 and 108. As shown in FIGURE 9, a contact area 118, similar to contact area 106 may be provided for region 28 of FIGURE 3.

Figure 11:
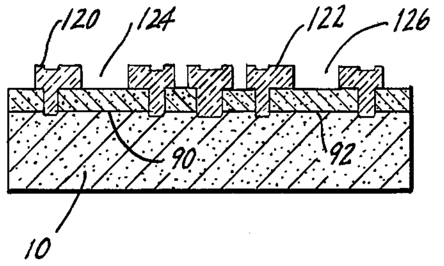
FIG. 11 is a cross-sectional view of an alternative embodiment of the invention showing the wafer of FIG. 6 prepared to receive a second epitaxially-grown layer in selected regions thereof.
Figure 12:
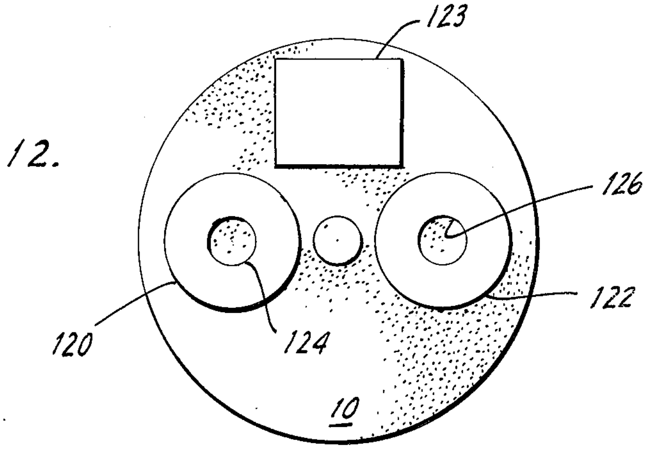
FIG. 12 is a plan view of the prepared wafer of FIG. 11.
Figure 13:
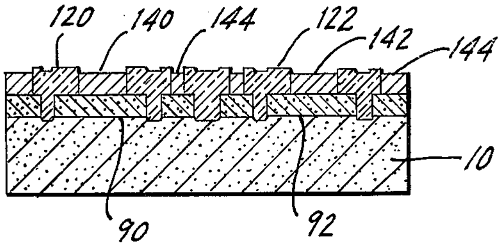
FIG. 13 is a cross-sectional view of the wafer of FIG. 12 showing the second epitaxially-grown layer.

The above description assumes that only a single epitaxial layer is to be grown on wafer 10. One layer is all that is required for junction diodes. However it may be necessary or desirabe to provide one or more additional layers of different conductivity type to form transistors, resistors or other circuit elements on the wafer 10. As shown in FIGURES 11, 12 and 13, the second and successive layers may be formed by steps similar to those employed in forming the first epitaxially-grown layer.

Starting with the reoxidized wafer shown in FIGURE 6, the oxide layer 12′ is removed in selected areas as shown in FIGURES 11 and 12 to leave areas 120 and 122 covering the regions 90 and 92. Areas 120 and 122 are provided with openings 124 and 126 in which the second layer is to be grown. These areas corresponding to openings 124 and 126 may represent, for example, the emitter areas of transistors in which regions 90 and 92 form the base regions.

Since it is possible that the masks or negatives used to expose the resist in the formation of areas 120 and 122 may be slightly misregistered with respect to the masks employed to form bands 14 and 16, it is usually desirable to make areas 120 and 122 slightly larger in diameter than bands 14 and 16. Area 28 may be left masked by region 123 as shown.

FIGURE 13 shows the structure of FIGURES 11 and 12 after the epitaxial-growth of the second layer in regions 140 and 142 within openings 124 and 126 and area 144 outside the masks 120 and 122. The second layer may be grown in the same manner as the first layer. However the second layer generally will have an impurity type or resistivity different from that of the first epitaxially-grown layer. Following the growth of the second layer the wafer 10 may be reoxidized to again form a continuous overlying layer of oxide. Electrodes connecting to the respective epitaxially-grown regions and wafer 10 may then be formed in the manner illustrated in FIGURES 7 and 8. It should be understood that, while areas 120 and 122 represent bands of substantially greater width than bands 14 and 16 of FIG. 3, the the percentage of the total upper surface area of wafer 10 covered by areas 120, 122, 123 etc. is still far less than the percentage area covered using conventional masking techniques.

In applications where regions of epitaxially-grown material surrounding regions 140 and 142 but electrically isolated therefrom may be tolerated, the masking areas 120 and 122 may be replaced by narrow masking rings surrounding regions 140 and 142. Rings of oxide overlying rings 14 and 16 and slightly overlapping the edge of regions 90 and 92 should be left to prevent the second layer from short circuiting the junction between wafer 10 and the regions 90 and 92.

It will be understood that the foregoing detailed description is by way of example only and that the method is applicable to a wide variety of procedures so long as the respective masks are formed by narrow bands of oxide surrounding the regions to be epitaxially-grown, thereby providing a minimum dimensions between any point on the oxide layer and exposed face of the wafer and also providing a maximum exposed area of the wafer surface. Therefore, while an example has been given of growing a layer of one conductivity-type on a wafer or layer of different conductivity-type, in many instances the epitaxially-grown layer and wafer or successively grown layers may be the same conductivity-type although usually of different conductivity.

Again, while the description has been in terms of a preferred embodiment of a silicon dioxide mask on a silicon wafer the invention in its broadest scope is applicable to any suitable masking oxide on any substrate on which epitaxial growth regions may be formed.

Therefore while the invention has been described with respect to representative embodiments thereof, it will be understood that it is susceptible to embodiment in any of a wide variety of forms different from those specifically shown and described, without departing from the scope of the invention as defined by the appended claims.

I claim:

1. The method of fabricating a geometrically defined epitaxially-grown region which comprises, forming on a single-crystalline surface of a body a narrow, adherent band of a masking oxide so as to define the periphery of an area upon which said layer is to be formed, exposing said surface of said body and said narrow band to a gaseous stream including a reactant gas of a composition including at least the material to be epitaxially-grown over the single-crystalline surface, and maintaining said single-crystalline surface at an elevated temperature sufficient to cause epitaxial growth of said material to occur at said single-crystalline surface, said elevated temperature being below that temperature which would result in the deposition of said material generally over the surface of said masking oxide.

said width of said band of masking oxide being less than the width necessary to support crystallite growth of said material on said masking oxide at said elevated temperature.

2. The method of fabricating a geometrically-defined epitaxially-grown region which comprises forming on a single-crystalline surface of a body a narrow, adherent band of a masking oxide so as to define the periphery of an area upon which said layer is to be formed, and explosing the surface of said body and said narrow band to a gaseous atmosphere including a reactant gas of composition including at least the material to be epitaxially-grown over the single-crystalline surface and, maintaining said single-crystalline surface at an elevated temperature sufficient to cause epitaxial growth of said material to occur at said single-crystalline surface, said narrow band having a width less than the width necessary to sustain crystallite growth.

3. The method of fabricating a geometrically-defined, epitaxially-grown region which comprises, forming on a single-crystalline surface of a body an adherent band of masking oxide having a width not greater than approximately 5 mils so as to define the periphery of an area upon which said layer is to be formed, and exposing said surface of said body and said band to conditions which produce on said body an epitaxially-grown layer while leaving said masking oxide substantially free of deposited material, whereby the growth of crystallites of said material of said epitaxially-grown layer on said masking oxide is prevented.

4. The method of claim 2 wherein epitaxial growth is obtained by vapor deposition including the hydrogen reduction at elevated temperature of silicon tetrachloride and a halide of a conductivity-affecting impurity metal.

5. The method of claim 2 wherein epitaxial growth is obtained by the pyrolysis of $SiH_4$.

6. The method of fabricating a geometrically-defined epitaxially-grown layer which comprises forming on a single-crystalline surface of a body of silicon a narrow, adherent band of silicon dioxide so as to define the periphery of an area upon which layer is to be formed, and exposing said surface of said body and said narrow band to conditions which produce on said silicon body upon said area an epitaxially-grown layer of silicon having a conductivity type different from that of said body underlying said area, the width of said silicon dioxide band being narrower than the width necessary to support growth of crystallites on said band under said conditions which produce said epitaxially-grown layer.

7. The method in accordance with claim 6 in which said epitaxially-grown layer is formed by vapor deposition of silicon.

8. The method of claim 6 wherein said narrow adherent band is formed by growing a layer of silicon dioxide on said body of silicon and then selectively removing part of said layer.

9. The method of forming a geometrically-defined epitaxially-grown layer which includes the steps of forming on a single-crystalline surface of a body a plurality of separate, closely-spaced, and substantially parrallel narrow, adherent bands of a masking oxide, one of said bands arranged to define the periphery of an area upon which said layer is to be formed, and another of said bands lying outside said area, and exposing said surface of said body and said bands to epitaxially-growth conditions for producing on said body an epitaxially-grown layer, the width of each of said oxide bands being narrower than the width necessary to support growth of crystallites on said bands under said conditions which produce said epitaxially-grown layer.

References Cited by the Examiner

UNITED STATES PATENTS

| | | | |
|---|---|---|---|
| 2,995,473 | 8/61 | Levi | 148—1.5 |
| 3,025,589 | 3/62 | Hoerni | 148—175 |
| 3,044,147 | 7/62 | Armstrong | 148—1.5 |
| 3,047,438 | 7/62 | Mariance | 148—175 |
| 3,098,774 | 7/63 | Mark | 148—175 |

OTHER REFERENCES

AIME Publication, Metallurgy of Semiconductor Materials, vol. 15, pages 35–37 and 43.

DAVID L. RECK, *Primary Examiner.*